United States Patent [19]

Morra et al.

[11] Patent Number: 5,514,424
[45] Date of Patent: May 7, 1996

[54] PROCESS FOR REDUCING THE FRICTION COEFFICIENT BETWEEN WATER AND SURFACES OF POLYMERIC MATERIALS AND RESULTING ARTICLE

[75] Inventors: Marco Morra, Asti; Ernesto Occhiello; Fabio Gabrassi, both of Novara, all of Italy

[73] Assignee: Enichem S.p.A., Milan, Italy

[21] Appl. No.: 223,816

[22] Filed: Apr. 6, 1994

Related U.S. Application Data

[63] Continuation of Ser. No. 794,228, Nov. 19, 1991, abandoned.

[30] Foreign Application Priority Data

Nov. 21, 1990 [IT] Italy ................................ 22142/90

[51] Int. Cl.$^6$ .................................................. C08J 7/18
[52] U.S. Cl. .................. 427/490; 427/307; 427/322; 427/491; 427/569
[58] Field of Search .......................... 427/490, 491, 427/534, 307, 322, 569

[56] References Cited

U.S. PATENT DOCUMENTS

| | | | |
|---|---|---|---|
| 3,311,491 | 3/1967 | Reichardt et al. | 427/41 X |
| 3,776,762 | 12/1973 | Bernath | 427/41 X |
| 3,879,238 | 4/1975 | Bierman et al. | 427/41 X |
| 4,188,426 | 2/1980 | Auerbach | 427/40 |
| 4,211,276 | 7/1980 | Itoh et al. | 165/1 |
| 4,404,256 | 9/1983 | Anand et al. | 428/409 |
| 5,006,411 | 4/1991 | Motanari et al. | 427/41 X |
| 5,041,304 | 8/1991 | Kusano et al. | 427/41 |

OTHER PUBLICATIONS

DataBase WPII, 87–274411, & JP-A-62-191-447, Aug. 21, 1987, "Water Treat Base Material Repel Rough Plasma Polymerise Film Forming Surface Apply Film".

Database WpII, 89–027827, & JP-A-63-301-241, Dec. 8, 1988, "Preparation Rubber Goods Surface Low Friction Coefficient Apply Low Temperature Plasma Treat Rubber Mould Surface".

*Primary Examiner*—Bernard Pianalto
*Attorney, Agent, or Firm*—Oblon, Spivak, McClelland, Maier & Neustadt

[57] ABSTRACT

Process for reducing the friction coefficient between water, and, surfaces of fabricated bodies made from polymeric materials, and for increasing the water repellency of said surfaces, which process comprises treating the concerned surface with a corrosive solution, and coating it with a thin layer of fluorinated polymer.

4 Claims, 2 Drawing Sheets

PROCESS FOR REDUCING THE FRICTION COEFFICIENT BETWEEN WATER AND SURFACES OF POLYMERIC MATERIALS AND RESULTING ARTICLE

This application is a continuation of application Ser. No. 07/794,228, filed on Nov. 19, 1991, now abandoned.

The present invention relates to a process for reducing the friction coefficient between water and surfaces of bodies fabricated from polymeric materials, and for increasing the water repellency of said surfaces.

More particularly, the instant invention relates to a process for reducing the friction coefficient between water and surfaces of bodies fabricated from polymeric materials with an average value of water contact angle of less then 90°, and for increasing the water repellency of said surfaces.

It is well-known that ideal surfaces, characterized by particular morphologies and values of surface energy, display, with water, that phenomenon which is known as "composite interface". In this regard, reference may be made to the chapter by R. E. Johnson Jr. and R. H. Dettre in the book: "Surface and Colloid Science", page 85, E. Matijevic Editor, published by Wiley-Interscience, New York, 1969, or to the paper by A. W. Neumann in: "Advanced Colloid Interface Science", 3, page 105, 1974.

BRIEF DESCRIPTION OF THE DRAWINGS

An ideal surface, characterized by a "composite interface" is depicted in accompanying FIGS. 1 and 2 and contact angles may be observed in FIG. 3.

The necessary surface morphology is defined by the characteristic geometry, with a slope defined by the angle "a". It being given for granted that the surface forms with water an equilibrium contact angle, as defined in the above references, of value "b", in order to obtain the "composite interface" the condition $$a \geq 180° - b$$

must necessarily be met.

The other necessary condition for the ideal surface to show, with water, a "composite interface", is that equilibrium contact angle formed by water with it meets the further condition:

$$b > 90°.$$

If these conditions are both met, water is unable to penetrate the interior of the cavities existing on the surface.

The contact angle, as measured under these conditions, is determined by the Cassie-Baxter relationship, as described by R. E. Johnson Jr. and R. H. Dettre in the above cited text, and increases up to very high values.

However, the real polymeric surfaces are very different from the ideal ones, as widely described by S. Wu in "Polymer Interface and Adhesion", published by M. Dekker, New York, 1982.

Figure 1:
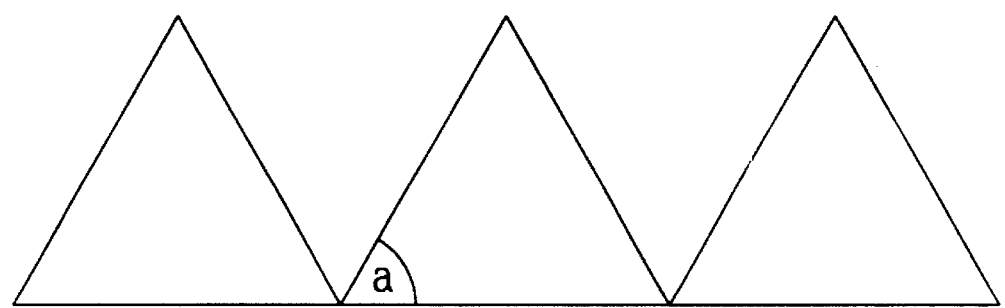
Figure 2:
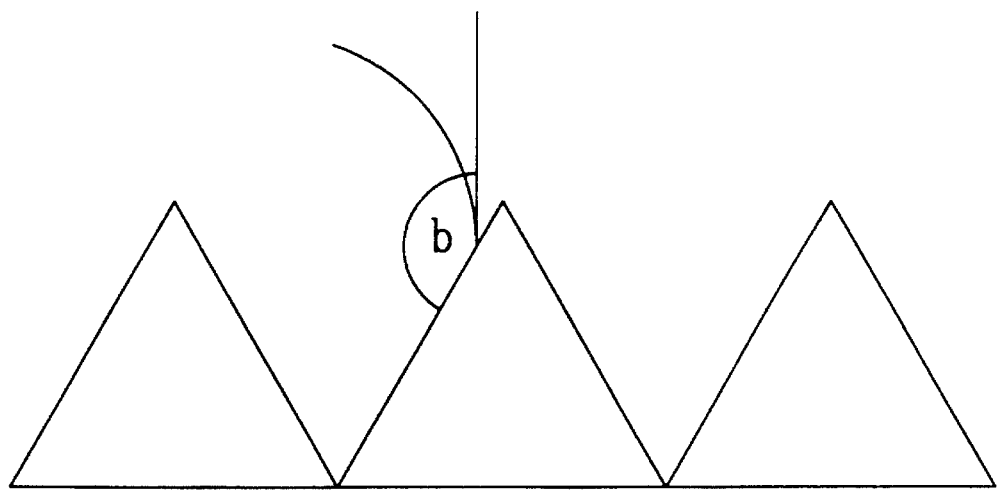

First of all, said real surfaces do not show the regular roughness depicted in FIGS. 1 and 2. Furthermore, their chemical and physical heterogeneity induces the phenomenon known as the "hysteresis of the contact angle", discussed in the above cited texts. As a consequence of such a phenomenon, the real polymeric surfaces display a more or less wide range of thermodynamically and kinetically allowed contact angles.

This range is characterized by two limit contact angles, which are given the names of "advancement angle" and "recession angle".

Furthermore, from the state of the art it results that in general no bodies fabricated from polymeric materials—which can be obtained by means of the common methods of fabrication of plastics materials—exist, the surfaces of which display values higher than 90° of both water contact angles.

The present Applicant found now a process which enables the surface of bodies fabricated from polymeric materials to be modified in such a way that such a surface will display the phenomenon of the "composite interface" with water, by giving the surface of the body a suitable roughness and coating it with a coat obtained from the plasma-induced polymerization of fluorinated monomers.

It was observed that such a kind of surfaces show very high characteristics of water repellency, and a substantial decrease was observed as well in the friction coefficient of water with such surfaces.

Therefore, an object of the instant invention is a process for reducing the friction coefficient between surfaces of fabricated bodies manufactured from a polymeric material, and water, and increasing the water repellency of said surfaces, which process comprises:

(a) treating the surface of the fabricated body with a corrosive means;

(b) coating the so treated surface with a thin layer of fluorinated polymer obtained by starting (from a plasma, in which a gas phase is used, which is constituted by at least one fluorinated monomer.

More particularly, an object of the present invention is a process for obtaining fabricated bodies manufactured from a polymeric material with a water-repellant surface and reduced friction between their surface and water, which process comprises:

(a) treating the surface of the fabricated body, with a corrosive means, until conditions of control led roughness are obtained, characterized by structures of size comprised within the range of from 0.2 to 2 micrometers, preferably of from 0.5 to 1 micrometer;

(b) coating the so coated surface with a layer of fluorinated polymer, with a thickness comprised within the range of from 1 to 1000 nm, obtained by means of plasma-induced polymerization of at least one fluorinated monomer, The corrosive treatment of step (a) can be accomplished by means of known methods, as disclosed, e.g., in S. Wu: "Polymers Interface and Adhesion", page 279; or I. A. AbuIsa: "Polymer Plastics Technology Engineering"2, 29, 1973; or in the text by R. C. Snogren: "Handbook of Surface Preparation", Palmerton, N.Y., 1974.

Any corrosive means capable of forming conditions of roughness on a polymeric surface can be used in the process according to the present invention. Illustrative examples comprise: oxidizer acidic means, such as sulfuric acid, hydrochloric acid, phosphoric acid, nitric acid, $(C_1-C_{10})$-alkyl-sulfonic acids, difluoroacetic acid, and so forth, containing, in saturated solution, oxidizer salts, such as potassium dichromate, potassium permanganate, sodium hypochlorite, potassium perchlorate, and so forth; or alkaline means, such as alkali-metal hydroxides, as sodium hydroxide, potassium hydroxide, and so forth.

The generation of a controlled surface roughness, as disclosed hereinabove, can be verified by scanning electron microscopy (SEM) or by the naked eye in that, at surficial structures of size of from 0.2 to 2 micrometers, phenomena of light scattering arise, which give the surface a rough/matt appearance whilst, before the treatment, said surface had a glossy appearance.

The coating, with a fluorinated polymer, of the surface treated with said corrosive means, is carried out by plasma-induced polymerization. This polymerization technique is known in the art and is described, e.g., in the text: "Plasma Polymerization" by H. Yasuda, Academic Press, Orlando, 1985, or in the text: "Thin Film Processes", edited by J. L. Vossen and W. Kern, Accademica Press, New York, 1978.

The fluorinated polymers used i n plasma-induced polymerization are preferably obtained by starting from monomers selected from the group consisting of perfluorinated alkanes or alkenes of from 1 to 10 carbon atoms. Illustrative examples of such monomers comprise: carbon tetrafluoride, perfluoroethylene, hexafluoroethane, octafluoropropane, hexafluoropropene, decafluorobutane, decafluoroisobutane, octafluorobutene, and so forth, optionally mixed with such coadjuvants as oxygen, hydrogen, inert gases as argon, and so forth.

At the end of the polymerization, the layer of fluorinated polymer has a thickness comprised within the range of from 1 to 1000 nm, preferably of from 1 to 500 nm or, even better, of from 2 to 20 rim.

The process according to the present invention is suitable for application to fabricated bodies of any shapes and sizes, obtained from polymers characterized by a range of contact angles of water which, on an average, is lower than 90°, such as polyolefins, such as high-density, medium-density, low-density linear polyethylene, polypropylene, ethylene-propylene copolymers, ethylene-propylene-diene copolymers, polystyrene, high-impact polystyrene, polystyrene modified with polar monomers, acrylonitrile-styrene copolymers (SAN), acrylonitrile-butadiene-styrene terpolymers (ABS); polyesters, such as poly-(ethylene terephthalate ), poly-(butylene terephthalate); polyamides; polyesteramides; polycarbonates; poly-(methyl methacrylates ); polyacrylates, and mixtures thereof.

The fabricated bodies made from polymeric materials, the surface of which is treated by the process of the present invention are advantageously used in all those sectors in which a high water repellency, or in which a low friction with water are required, for instance, in the nautical field, or in the preparation of medical equipment or elements.

In order to better understand the present invention and to practice it, some illustrative, non-limitative examples thereof are reported hereinunder.

For all the examples, an aluminum reactor (manufactured by Kenotec, Binasco, Italy) of cylindrical shape, with an inner diameter of approximately 40 cm and a height of about 30 cm, was used. The evacuation of the reactor, in order to be able to carry out the plasma-induced polymerization, was secured by a pumping device capable of reaching pressures of the order of 0.05 Pa. The necessary gases for the treatment were fed to the reactor by means of electronically controlled flow meters.

Whilst the remainder of the chamber is kept electrically connected with ground, to the upper electrode a radiofrequency is applied. An "Advanced Energy MTN 500" frequency generator was used, which is capable or supplying a power of from 0 to 500 W at 13.56 MHz. The triggering of the discharge induces the fragmentation of the fluorinated monomers added to the gas mixture, and the consequent deposition of a polymer onto the surface. The deposition rate and the chemical nature of the deposited polymer may be varied by suitably adjusting the characteristic plasma parameters, such as applied power, gas pressure and gas flowrate, as taught in the text by H. Yasuda, cited hereinabove.

EXAMPLE 1

For the experimental tests small plates (12.5×12.5× 0.3 cm) of high-density polyethylene (Eraclene QG 6015), designated in the following as "HPDE", manufactured by Montedipe of Milan, was used.

These plates were dipped in a chromic blend (98 parts by weight of sulfuric acid and 2 parts by weight of potassium dichromate), with temperature being kept at 353° K. The surface morphology was checked by SEM (Cambridge Stereoscan 604, Cambridge, U.K.) and it was found that it met the required conditions when its dipping time was comprised within the range of from 6 hours to 3 days.

The plates were then washed with water and acetone, were dried and then were charged to plasma reactor and were coated with a layer of fluorinated polymer. The fluorinated gas was perfluoropropene ($C_3F_6$), produced by Montefluos, epinetta Marengo, Italy). In following Table 1, the operating conditions of plasma reactor are reported.

Table 1

Radiofrequency: 13.56 MHz

Power: 100 W

Pressure: 2 Pa

Gas flowrate: 29 $cm^3$ (STP)/minute

Speed of deposition from $C_3F_6$: 8.6 nm/minute

The thickness of deposited film, controlled by means of the treatment time, was evaluated by means of a quartz microbalance (Intellemetrics, Clydebank, U.K.). A density value of 2.2 was used, which is the same as the value reported for polytetrafluoroethylene (PTFE) in Encyclopaedia of Modern Plastics (McGraw-Hill, New York, 1987, page 517).

In Table 2, details as to the experimental tests carried out, are reported.

TABLE 2

| Campione | Stay Time in Chromic Mixture, hours | Thickness of the Fluorinated Polymer (nm) |
| --- | --- | --- |
| A | 0 | 5 |
| B | 1 | 5 |
| C | 6 | 5 |
| D | 24 | 5 |
| E | 36 | 5 |

SEM microphotographs were taken at 5,000× of an untreated HDPE (sample "A" before the polymer deposition from plasma); HDPE corroded with chromic blend for 1 hour (sample "B", before the deposition); HDPE corroded with chromic blend for 24 hours (sample "C", before the deposition); HDPE corroded with chromic blend for 24 hours and coated with 5 nm of fluoropolymer (sample "D", after the deposition).

The microphotograph of sample A showed the smooth, typical surface of an untreated material. In Sample B an incipient roughness was visible, but the average size of the observed structures was of less than 0.1 micrometers. In Sample C, the surface morphology could be seen, which corresponds to a treatment time shorter than 24 hours. It could be easily seen that the typical size of the surface structures had increased up to a value of the order of 0.5 micrometers. As the chemical attack continued, the surface roughness increased. Sample D showed that the coating of the sample with 5 nm of fluoropolymer did not cause meaningful changes in morphology.

The water advancement and recession contact angles of the samples were then measured. For that purpose, a Ramé-Hart instrument for measuring the contact angles was used (Ramé-Hart, Mountain Lakes, N. J., U.S.A.). The method of sessile drop was used, according to the procedures taught in above cited text by S. Wu.

In Table 3, the water advancement (A.A.) and recession (R.A.) contact angles (expressed as degrees) are reported, which are shown by corroded surfaces not coated with fluorinated polymer, and corroded, coated surfaces. The data relevant to sample "A" correspond to the untreated substrate (HDPE) and to the the fluoropolymer deposited by plasma polymerization on a smooth surface.

TABLE 3

| Sample | Corroded, not coated | | Corroded, coated | |
|---|---|---|---|---|
| | A.A. | R.A. | A.A. | R.A. |
| A | 96 | 63 | 116 | 95 |
| B | 80 | 30 | 130 | 20 |
| C | 65 | 0 | 165 | 140 |
| D | 58 | 0 | 163 | 148 |
| E | 50 | 0 | 170 | 145 |

From the data reported in Table 3, one may observe that the corrosion of the surface in an oxidizing environment causes a simultaneous decrease in contact angles, even causing—with long enough treatment times the recession angle to be zeroed.

In the case of sample "B", the generation of the surface roughness and the subsequent coating with fluorinated polymer induces a meaningful change in contact angles. However, in this case, insamuch as the roughness is not sufficient to form a "composite interface" with water, a wide range of possible contact angles may be observed, which indicates that the surface is still rather wettable.

In the case of samples "C", "D" and "E", on the contrary, a high enough roughness is observed, a "composite interface" is formed, and from Table 3 extremely high values of contact angles can be observed, which indicate an extremely high water repellency of the resulting surface.

Figure 3:
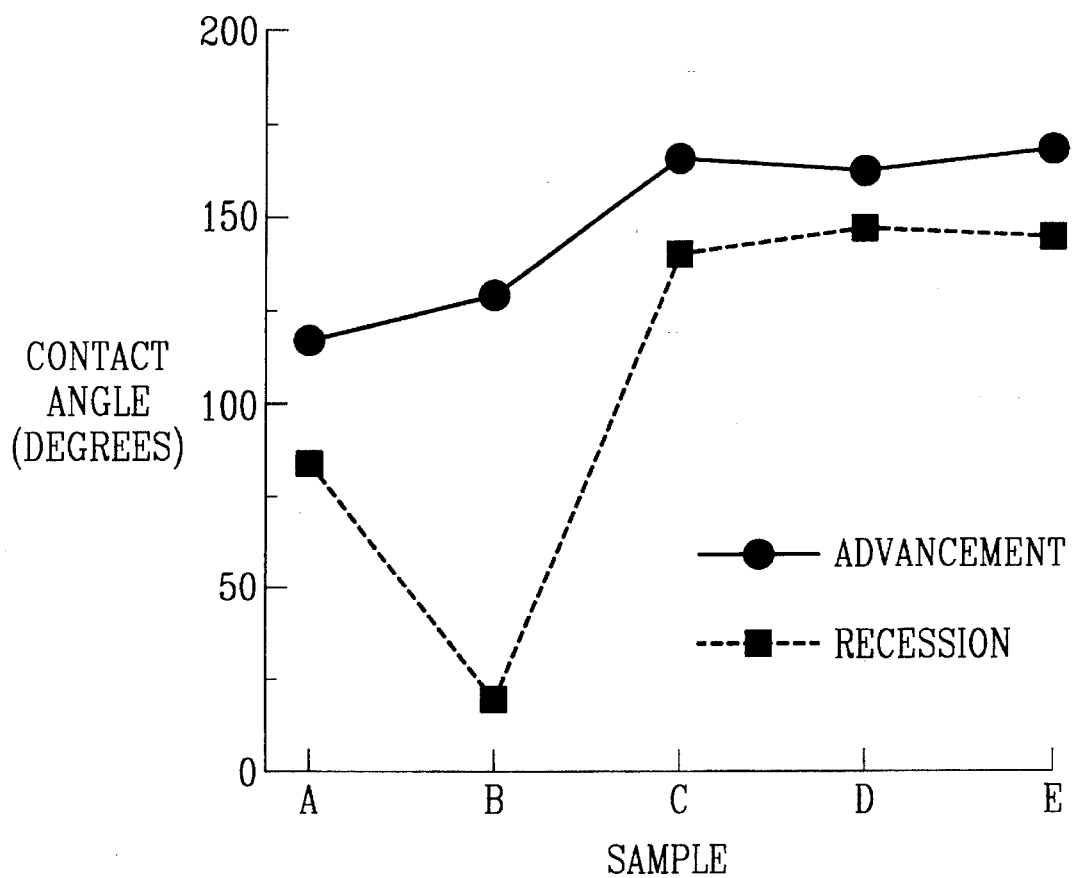

From FIG. 3, one may observe that the values of contact angles range from relatively low values (untreated, coated sample "A"), through the sample "B", in which the roughness induces a very high range of possible contact angles, to an extremely hydrophobic situation (samples "C", "D" and "E").

EXAMPLE 2

In this case, for the experimental tests small plates of high-density polyethylene and isotactic polypropylene (PP), i.e., Moplen SP 179, produced by Himont, Milan, Italy, were used. In both cases, the size was of 12.5×12.5×0.3 cm.

The treatments with the chromic blend and with plasma, as well as the observations by SEM and the measurements of water contact angles were carried out with the same procedures and conditions, as disclosed in the preceding example.

In this case, the behavlouts of HDPE and PP were compared, with the thickness of deposited layer and the used fluorinated monomer being changed.

In these tests, besides perfluoropropene, perfluoropropane was used ($C_3F_8$, produced by UCAR, Oevel, Belgium, deposition rate 4.9 nm/minute).

In Table 4, the materials used and the operating conditions are summarized, and in Table 5 the relevant contact angles are reported. The conclusions are analogous to those already drawn in Example 1.

TABLE 4

| Sample | Material | Stay Time in Chromic Blend (hrs) | Fluorinated Monomer | Film Thickness nm |
|---|---|---|---|---|
| F | PE | 24 | $C_3F_6$ | 2 |
| G | PE | 24 | $C_3F_6$ | 20 |
| H | PE | 24 | $C_3F_8$ | 2 |
| I | PE | 24 | $C_3F_8$ | 5 |
| J | PE | 24 | $C_3F_8$ | 20 |
| K | PP | 0 | $C_3F_6$ | 5 |
| L | PP | 1 | $C_3F_6$ | 5 |
| M | PP | 24 | $C_3F_6$ | 5 |
| N | PP | 24 | $C_3F_8$ | 5 |

TABLE 5

| | After Corrosion and Coating | |
|---|---|---|
| Sample | A.A. | R.A. |
| F | 168 | 140 |
| G | 162 | 143 |
| H | 165 | 142 |
| I | 167 | 141 |
| J | 167 | 142 |
| K | 116 | 92 |
| L | 125 | 31 |
| M | 171 | 148 |
| N | 163 | 150 |

For pristine PP, the corresponding values are: A.A.=95°, R.A.=78°.

EXAMPLE 3

For some samples (corroded for 24 hours and coated with 5 nm of polymer, from perfluoropropene plasma), the coefficients of static friction with water were evaluated. The experimental apparatus was derived from the equipment recommended by ASTM Standard D-4518, which relates to the measurement of the static friction coefficients. It consists in that the treated plate is kept anchored at one edge, and the other end of said plate can be lifted with a constant speed. A water drop with constant size (0.04 ml) is deposited onto a prefixed point of the surface, then the plate is slowly lifted and is immediately stopped as soon as the drop starts moving. The angle is recorded and the value of static friction is calculated. Said static friction is obtained as the product of gravity acceleration times the sinus of the read angle.

In Table 6, the results obtained are compared to those obtained on polytetrafluoroethylene (PTFE), a material which is known to be a very water-repellant one. The plasma polymer coating of the not corroded material enables a slight improvement to be obtained in friction with water, but, in any case, much worse values than with PTFE are obtained, probably due to the more heterogeneous chemical structure of the polymers produced by plasma polymerization.

In the case of the corroded, not-coated materials, the increased wettability causes the drop to remain firmly anchored to the surface. On the contrary, in corroded, coated materials, decisive improvements in friction are obtained, even as compared to PTFE.

TABLE 6

| Treatment | Angle (°) | Friction (ms$^{-2}$) |
| --- | --- | --- |
| PTFE | | |
| Untreated PTFE | 20 | 3.3 |
| HDPE | | |
| Untreated HDPE | (*) | (*) |
| Not corroded, coated HDPE | 32 | 5,1 |
| Corroded, not coated HDPE | (*) | (*) |
| Corroded, coated HDPE | 12 | 2,0 |
| PP | | |
| Untreated PP | 30 | 4,8 |
| Not corroded, coated PP | 28 | 4,6 |
| Corroded, not coated PP | (*) | (*) |
| Corroded, coated PP | 10 | 1,6 |

(*)The drop remains firmly anchored to the wall up to very high angle values.

We claim:

1. A process for reducing the friction coefficient between water and a surface of a fabricated body manufactured from a polymeric material, and increasing the water repellency of the surface, comprising:

(a) treating the surface of the fabricated body with a corrosive means selected from the group consisting of acid oxidizing means and alkaline means; and (b) coating the treated surface with a thin layer of fluorinated polymer obtained by plasma-induced polymerization of at least one gas phase fluorinated monomer.

2. A process for obtaining a fabricated body, manufactured from a polymeric material, which has a water-repellent surface and a reduced friction coefficient between a surface of the body and water, comprising:

(a) treating the surface of the fabricated body with a corrosive means selected from the group consisting of acid oxidizing means and alkaline means, until conditions of controlled roughness are obtained, wherein the surface comprises structures of a size within the range of from 0.2 to 2 micrometers; and (b) coating the treated surface with a layer of fluorinated polymer of thickness within the range of from 1 to 1000 nm, wherein said layer of fluorinated polymer is obtained by plasma-induced polymerization of at least one fluorinated monomer.

3. A process according to either one of claims 1 or 2, wherein said fluorinated polymers are obtained by plasma-induced polymerization of monomers selected from the group consisting of perfluorinated alkanes of from 1 to 10 carbon atoms and perfluorinated alkenes of from 2 to 10 carbon atoms.

4. A product prepared by the process of either one of claims 1 or 2, wherein the fabricated body is prepared from a polymeric material having a range of contact angles of water which average lower than 90°.

\* \* \* \* \*